(12) United States Patent
Tanaka et al.

(10) Patent No.: US 7,669,472 B2
(45) Date of Patent: Mar. 2, 2010

(54) LIQUID LEVEL DETECTOR AND LIQUID PROCESSING SYSTEM PROVIDED WITH THE SAME

(75) Inventors: Koji Tanaka, Tosu (JP); Teruomi Minami, Tosu (JP)

(73) Assignee: Tokyo Electron Limited, Tokyo (JP)

( * ) Notice: Subject to any disclaimer, the term of this patent is extended or adjusted under 35 U.S.C. 154(b) by 284 days.

(21) Appl. No.: 11/604,890

(22) Filed: Nov. 28, 2006

(65) Prior Publication Data
US 2007/0125171 A1 Jun. 7, 2007

(30) Foreign Application Priority Data
Nov. 30, 2005 (JP) ............................. 2005-345013

(51) Int. Cl.
*G01F 23/00* (2006.01)
(52) U.S. Cl. .................................... 73/290 R
(58) Field of Classification Search ............... 73/290 R, 73/304 R, 304 C
See application file for complete search history.

(56) References Cited

U.S. PATENT DOCUMENTS 5,244,550 A * 9/1993 Inoue .......................... 204/518

2003/0058316 A1 * 3/2003 Olsen ........................... 347/92

FOREIGN PATENT DOCUMENTS

JP 08-267027 10/1996

OTHER PUBLICATIONS

Laminar Flow and Turbulent Flow of Fluids by PipeFlow pp. 1-3.*

* cited by examiner

*Primary Examiner*—Hezron Williams
*Assistant Examiner*—Alex Devito
(74) *Attorney, Agent, or Firm*—Smith, Gambrell & Russell, LLP

(57) ABSTRACT

A liquid level detector 10 includes a liquid guiding pipe 14 that guides a liquid in a tank to an inside thereof in such a manner that a liquid level of the guided liquid conforms to a liquid level of the liquid in the tank, and a branching liquid guiding pipe 15 for detecting a liquid level, which branches off from the liquid guiding pipe to guide the liquid into an inside thereof in such a manner that a liquid level of the guided liquid conforms to a liquid level of the liquid in the tank. The branching liquid guiding pipe 15 is provided with position sensors 16 (16a, 16b, 16c, 16d) for detecting the liquid level of the liquid in the branching liquid guiding pipe 15. On a part where the liquid guiding pipe 14 and the branching liquid guiding pipe 15 are connected to each other, there is disposed a bubble passage prevention member 17 of a porous plate shape, which prevents bubble generated in the liquid from entering the branching liquid guiding pipe 15.

11 Claims, 4 Drawing Sheets

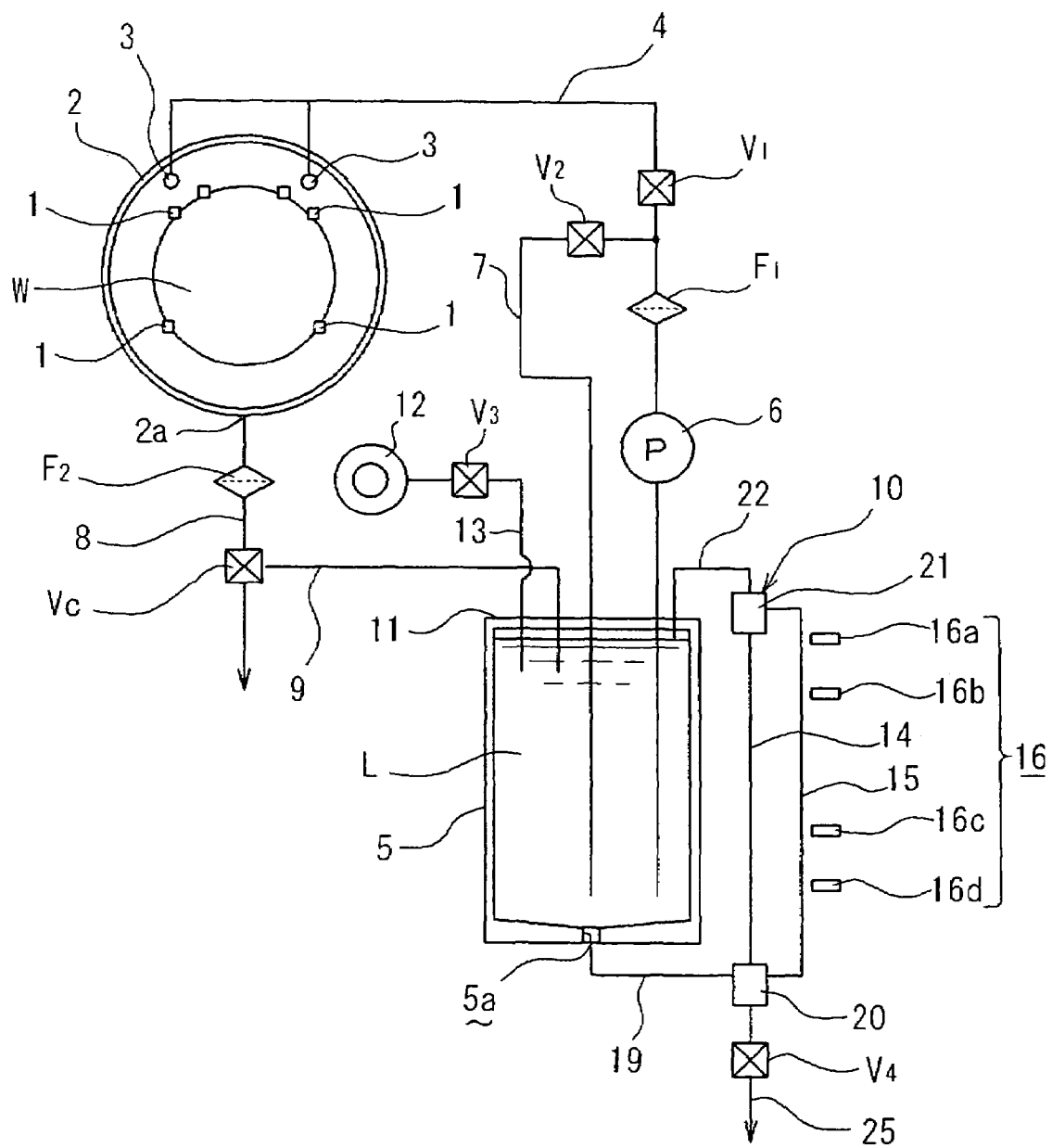
F I G. 1

LIQUID LEVEL DETECTOR AND LIQUID PROCESSING SYSTEM PROVIDED WITH THE SAME

FIELD OF THE INVENTION

The present invention relates to a liquid level detector and a liquid processing system provided with the same. More particularly, it pertains to a liquid level detector that monitors an amount of a liquid such as a process liquid stored in a tank, and a liquid processing system provided with the liquid level detector.

BACKGROUND OF THE INVENTION

In a liquid processing technique for processing objects to be processed such as semiconductor wafers by supplying thereto a process liquid, it is generally important to monitor an amount of the process liquid stored in a tank.

The amount of the process liquid stored in the tank has been usually detected by a liquid level sensor. For example, a liquid level detector has been known in the conventional art (e.g., JP Patent No. 3349862) including: a liquid level measuring pipe having one end connected to a tank storing a process liquid, and the other end disposed on a position higher than the liquid level of the process liquid in the tank; a liquid level sensor for detecting a position of the liquid level of the process liquid stored in the tank by means of the process liquid fed to the liquid level measuring pipe from the tank; and a bubble removing pipe for removing bubbles, having one end connected to the liquid level measuring pipe at a position lower than the liquid level of the process liquid in the tank, and the other end opened at a position higher than the liquid level of the process liquid in the tank.

In the art described in JP Patent No. 3349862, the liquid level measuring pipe and the bubble removing pipe are connected to each other via a horizontal pipe connected to a side part of the tank. Suppose that bubbles are generated when the process liquid in the tank is discharged, and the bubbles remain in a part (i.e., the horizontal pipe) where the liquid level measuring pipe and the bubble removing pipe are connected to each other. Then, in some cases, when the new process liquid is supplied into the tank after the used process liquid is discharged, there is a possibility that the bubbles still remaining in the connecting part (horizontal pipe) enter the liquid level measuring pipe so as to invite a malfunction of the liquid level sensor.

In particular, when a hydrogen peroxide solution ($H_2O_2$) containing a surface active agent is used as a process liquid, larger bubbles are likely to be generated. If such larger bubbles enter the liquid level measuring pipe, the amount of the process liquid in the tank may not be accurately detected.

The present invention has been made in view of the above circumstances. The object of the present invention is to provide a liquid level detector capable of accurately detecting and monitoring an amount of a liquid stored in a tank, without suffering from an influence of bubbles generated in the liquid, and to provide a liquid processing system provided with the liquid level detector.

SUMMARY OF THE INVENTION

The present invention is a liquid level detector for detecting a liquid level of a liquid stored in a tank, comprising: a liquid guiding pipe connected to the tank and guiding the liquid in the tank to an inside thereof in such a manner that a liquid level of the guided liquid conforms to a liquid level of the liquid in the tank; a branching liquid guiding pipe for detecting a liquid level, the branching liquid guiding pipe branching off from the liquid guiding pipe and guiding the liquid into an inside thereof in such a manner that a liquid level of the guided liquid conforms to a liquid level of the liquid in the tank; a position sensor for detecting a liquid level of the liquid in the branching liquid guiding pipe; and a bubble passage prevention member of a porous plate shape disposed on a part where the liquid guiding pipe and the branching liquid guiding pipe are connected to each other, for preventing bubbles generated in the liquid from entering the branching liquid guiding pipe from the liquid guiding pipe.

According to this structure, even when the liquid including bubbles generated therein flows from the tank to the liquid guiding pipe and the branching liquid guiding pipe, it is possible to prevent the bubbles from entering the branching liquid guiding pipe by means of the bubble passage prevention member. Thus, the liquid level of the liquid in the branching liquid guiding pipe can be accurately detected.

The present invention is a liquid processing system comprising a tank for storing a process liquid, a processing part where an object to be processed is processed by the liquid in the tank, and a liquid level detector for detecting a liquid level of the liquid stored in the tank, wherein the liquid level detector including: a liquid guiding pipe connected to the tank and guiding the liquid in the tank to an inside thereof in such a manner that a liquid level of the guided liquid conforms to a liquid level of the liquid in the tank; a branching liquid guiding pipe for detecting a liquid level, the branching liquid guiding pipe branching off from the liquid guiding pipe and guiding the liquid into an inside thereof in such a manner that a liquid level of the guided liquid conforms to a liquid level of the liquid in the tank; a position sensor for detecting a liquid level of the liquid in the branching liquid guiding pipe; and a bubble passage prevention member of a porous plate shape disposed on a part where the liquid guiding pipe and the branching liquid guiding pipe are connected to each other, for preventing bubbles generated in the liquid from entering the branching liquid guiding pipe from the liquid guiding pipe.

According to this structure, even when the process liquid including bubbles generated therein flows from the tank to the liquid guiding pipe and the branching liquid guiding pipe, it is possible to prevent the bubbles from entering the branching liquid guiding pipe by means of the bubble passage prevention member. Thus, the liquid level of the liquid in the branching liquid guiding pipe can be accurately detected.

In the above inventions, it is preferable that a surface of the bubble passage prevention member is substantially coplanar with an inner wall surface of the liquid guiding pipe.

According to this structure, when the liquid in the tank is discharged, the liquid in the branching liquid guiding pipe is also discharged, and no liquid remains in the branching liquid guiding pipe.

It is preferable that a diameter of each hole in the bubble passage prevention member is between 0.5 mm to 0.8 mm. The reason for setting the diameter of each hole between 0.5 mm and 0.8 mm is as follows. That is, when the diameter is smaller than 0.5 mm, it is difficult for a liquid to pass through the hole because of a surface tension. On the other hand, when the diameter is larger than 0.8 mm, it is difficult for a liquid to flow through the hole because of bubbles blocking up the hole.

Since each hole has a diameter of from 0.5 mm to 0.8 mm, the bubble passage prevention member makes it possible that only the liquid flowing from the tank to the branching liquid guiding pipe to pass through the bubble passage prevention member, without allowing the bubbles included in the liquid to pass therethrough.

It is preferable that the liquid guiding pipe is in communication with a communication channel extending downward from the part where the liquid guiding pipe and the branching liquid guiding pipe are connected to each other, and a liquid discharge pipe is connected to a lower end of the communication channel.

According to this structure, the liquid discharge pipe is positioned below the part where the liquid guiding pipe and the branching liquid guiding pipe are connected to each other. Thus, after the liquid in the tank is discharged from the liquid discharge pipe, the liquid can be prevented from remaining in the branching liquid guiding pipe.

In addition, it is preferable that an upper opening of the tank is closed by a lid, and an upper end of the liquid guiding pipe and an upper end of the branching liquid guiding pipe are connected to an inside of the tank.

According to this structure, it is possible to prevent a process liquid in the tank from being exposed to the outside air.

BRIEF DESCRIPTION OF THE DRAWINGS

FIG. 1 is a schematic structural view of an example of a liquid processing system according to the present invention;

DETAILED DESCRIPTION OF THE PREFERRED EMBODIMENT

Figure 2:
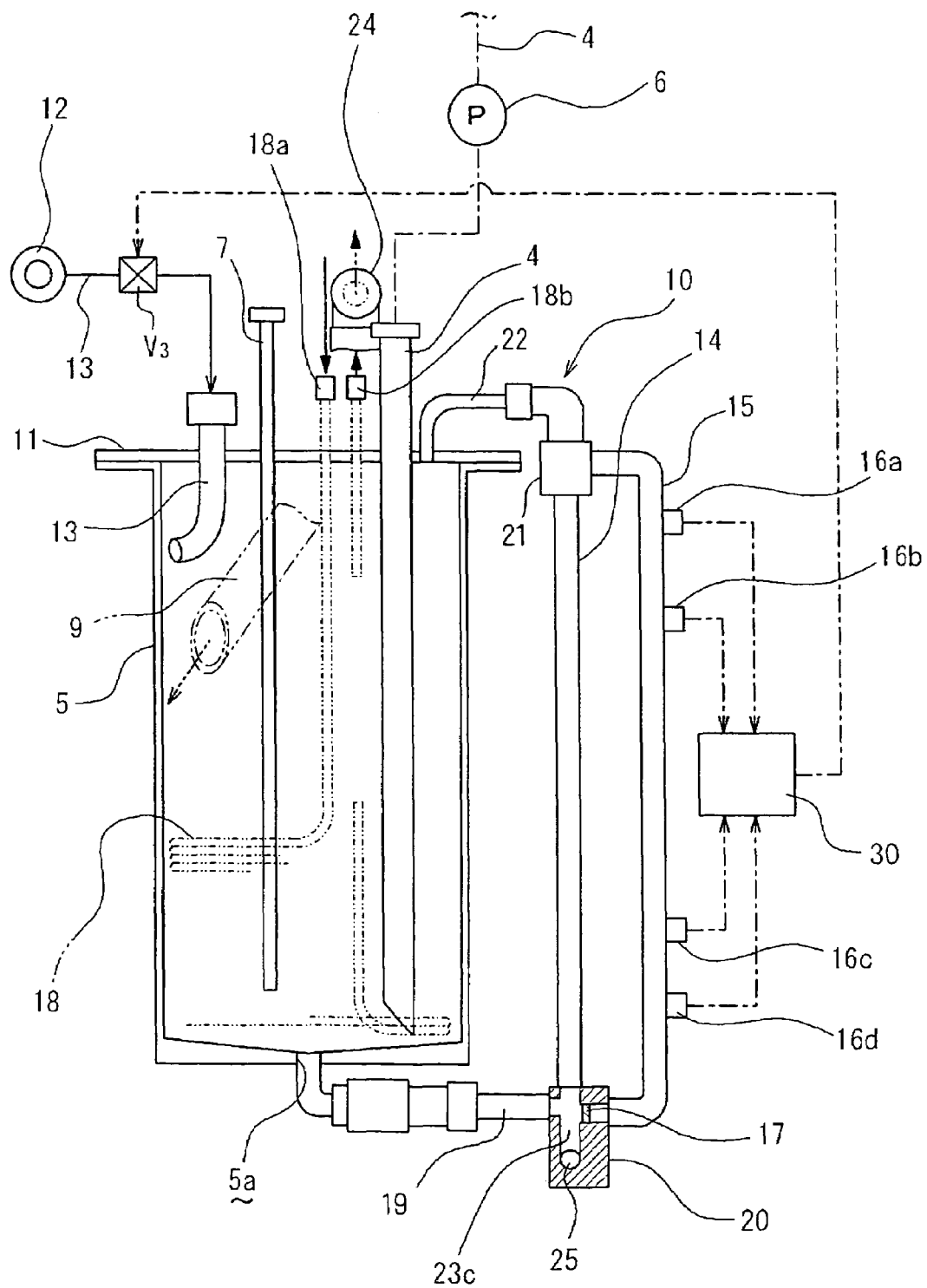
FIG. 2 is a schematic structural view of an example of a liquid level detector according to the present invention.

The best mode for carrying out the invention will be described in detail below with reference to the accompanying drawings.

FIG. 1 is a schematic structural view of an example of a liquid processing system provided with a liquid level detector according to the present invention.

The liquid processing system is a system that removes, after an etching process, from a semiconductor wafer W as an object to be processed (hereinafter referred to as "wafer W"), a resist layer, a polymer layer as an etching residue, and a metal deposit deposited on the wafer W which is caused by a sputtering in the etching process.

The liquid processing system includes a chamber 2 as a processing part for accommodating a plurality of, e.g., twenty-six wafers; two injection nozzles 3 disposed on an upper part of the chamber 2 and provided with a number of injection holes (not shown) from which a process liquid such as a hydrogen peroxide solution ($H_2O_2$) is injected; and a tank 5 for supplying a process liquid, the tank being connected to the injection nozzles 3 through a supply pipe 4. In the chamber 2, the wafers W are supported by a plurality of holding rods 1 (six rods are illustrated). The holding rods 1 are arranged parallel to each other, and are rotated by a rotor, not shown. A liquid level detector 10 according to the present invention is mounted on the tank 5.

The supply pipe 4 is provided with a supply pump 6, a filter F1, and an on-off valve V1, in this order from the tank 5. A circulating pipe 7, on which an on-off valve V2 is disposed, branches off from the supply pipe 4 on an upstream side of the on-off valve V1. A distal end of the circulating pipe 7 is connected to an inside of the tank 5. Due to the provision of the circulating pipe 7, a process liquid L stored in the tank 5 can be circulated by driving the supply pump 6, with the on-off valve V1 being closed while the on-off valve V2 being opened.

A drain pipe 8 is connected to a drain port 2a formed in a bottom part of the chamber 2. A filter F2 and a switching valve Vc are arranged on the drain pipe 8. A returning pipe 9 is connected to the inside of the tank 5 via the switching valve Vc. Thus, the process liquid used for processing the wafers W can be returned to the tank 5 through the returning pipe 9.

As shown in FIG. 2, the tank 5 is made of a fluorocarbon resin such as PFA, and is formed into a bottomed cylindrical shape. A bottom part of the tank 5 is recessed at a center portion thereof. An upper opening of the tank 5 is closed by a lid 11 made of a fluorocarbon resin such as PFA. The process liquid L is stored in the tank 5. A process liquid supply pipe 13 connected to a process liquid supply source 12 and having an on-off valve V3, and the returning pipe 9 are arranged inside the tank 5 via through-holes (not shown) formed in the lid 11 such that supply ports of the respective process liquid supply pipe 13 and the returning pipe 9 are directed toward an inner wall surface of the tank 5. The reason for directing the supply ports of the process liquid supply pipe 13 and the returning pipe 9 toward the inner wall surface of the tank 5 is to restrain generation of bubbles by allowing the process liquid supplied from the process liquid supply pipe 13 and the returning pipe 9 into the tank 5 to hit against the inner wall surface of the tank.

Figure 3:
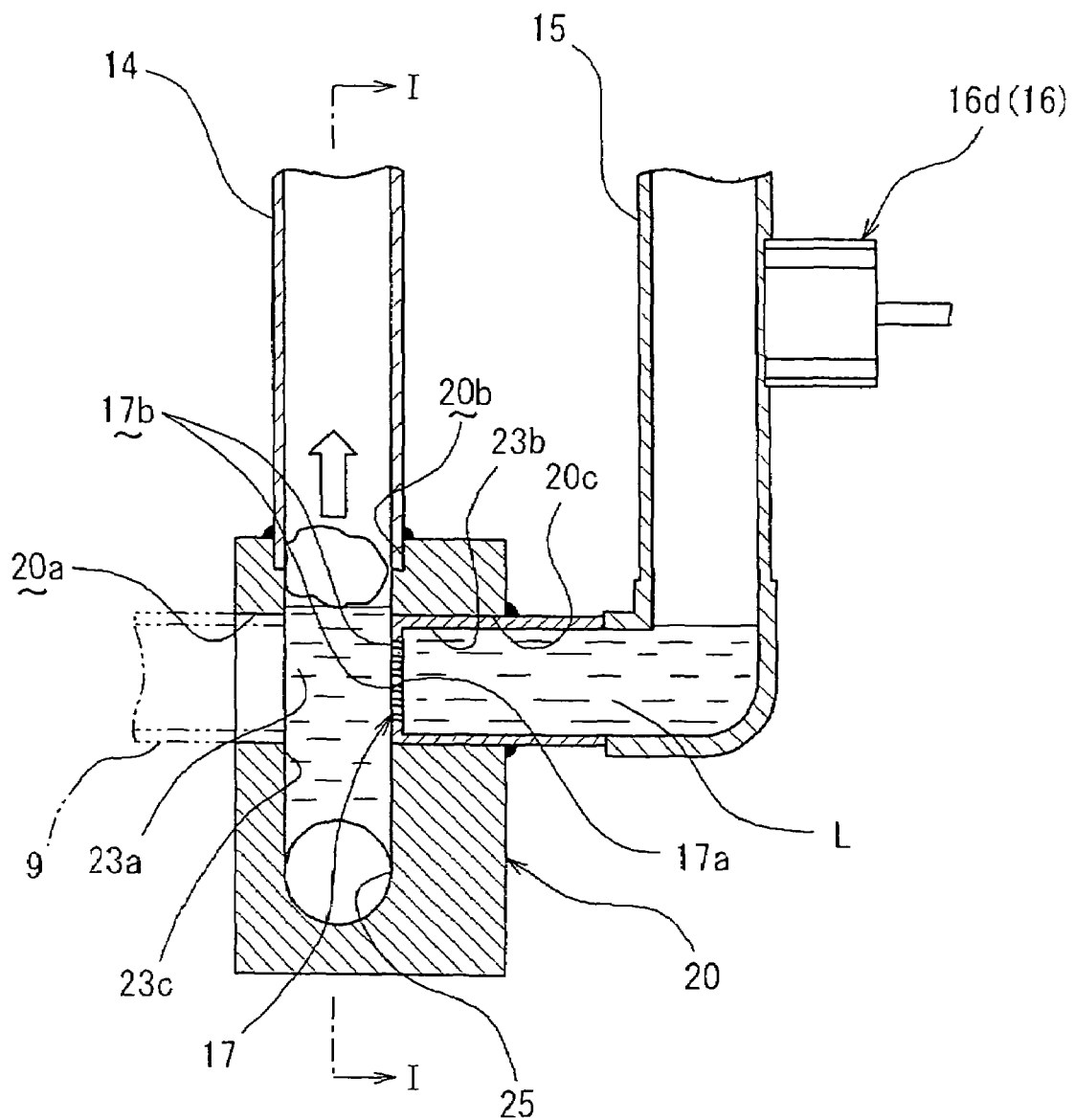
FIG. 3 is a sectional view of a main part of the invention.
Figure 4:
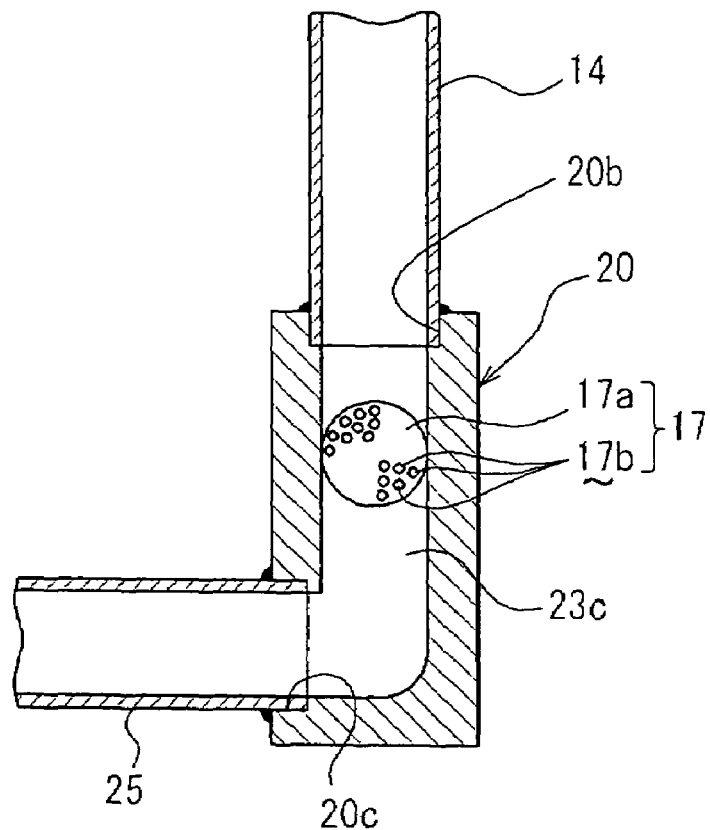
FIG. 4 is a sectional view of FIG. 3 taken along the line I-I.

As shown in FIGS. 2 to 4, the liquid level detector 10 includes a liquid guiding pipe 14, a branching liquid guiding pipe 15, position sensors 16 (to be specific, a plurality of, for example, four position sensors 16a, 16b, 16c, 16d), and a bubble passage prevention member 17 of a porous plate shape. The liquid guiding pipe 14 guides the process liquid L stored in the tank 5 into an inside of the liquid guiding pipe 14 such that a liquid level of the guided process liquid L conforms to the liquid level of the process liquid L in the tank 5. The branching liquid guiding pipe 15, which detects a liquid level, branches off from the liquid guiding pipe 14 and guides the process liquid L stored in the tank 5 into an inside of the branching liquid guiding pipe 15 such that a liquid level of the guided process liquid L conforms to the liquid level of the process liquid L in the tank 5. The position sensors 16 detect a liquid level of the process liquid in the branching liquid guiding pipe 15. The bubble passage prevention member 17, which prevents bubbles generated in the process liquid from entering the branching liquid guiding pipe 15, is disposed on a part where the liquid guiding pipe 14 and the branching liquid guiding pipe 15 are connected to each other.

A coiled heater, not shown, surrounds an outer circumference of the tank 5. A coiled cooling pipe 18 is disposed inside the tank 5 at a lower part thereof. The cooling pipe 18 extends upward from the tank 5, and has a coolant supply port 18a formed on one end thereof and a coolant discharge port 18b formed on the other end thereof. A discharge pipe 24 is connected to the upper opening of the tank 5 through an outlet (not shown) formed in the lid 11.

A liquid discharge port 5a is formed in the bottom part of the tank 5. One end of a horizontal pipe 19 is connected to the liquid discharge port 5a. A lower end of the vertically extending liquid guiding pipe 14 is connected to the other end of the horizontal pipe 19 through a block-like coupling 20. An upper end of the liquid guiding pipe 14 is connected to an upper horizontal pipe 22 connected to the opening of the tank 5 through an upper coupling 21. The horizontal pipe 19, the coupling 20, the liquid guiding pipe 14, the upper coupling 21, and the upper horizontal pipe 22 are made of a fluorocarbon resin such as PFA.

The branching liquid guiding pipe 15 branching off from the liquid guiding pipe 14 is vertically arranged in parallel with the liquid guiding pipe 14. A lower end of the branching liquid guiding pipe 15 is connected to the coupling 20, while an upper end thereof is connected to the upper coupling 21. Similar to the tank 5, the liquid guiding pipe 14, and so on, the branching liquid guiding pipe 15 is made of a fluorocarbon resin such as PFA.

As shown in FIGS. 2 to 4, the coupling 20 connecting the liquid guiding pipe 14 and the branching liquid guiding pipe 15 to each other is provided with on its one side a first communication hole 20a connected to the horizontal pipe 19. In an upper surface of the coupling 20, there is formed a second communication hole 20b connected to the liquid guiding pipe 14. The first communication hole 20a and the second communication hole 20b are communicated with each other through a communication channel 23a. On the other side of the coupling 20, there is formed a third communication hole 20c through a communication channel 23b which branches off from the communication channel 23a in communication with the liquid guiding pipe 14. A lower end of the branching liquid guiding pipe 15 is connected to the third communication hole 20c. The bottomed cylindrical bubble passage prevention member 17, which is made of a fluorocarbon resin such as PFA, is joined to a lower end of the branching liquid guiding pipe 15 by fixing means such as welding. Specifically, the bubble passage prevention member 17 is fitted in the third communication hole 20c and is joined to the lower end of the branching liquid guiding pipe 15 by fixing means such as welding such that a bottom plate 17a forming a surface of the bubble passage prevention member 17 is coplanar with an inner wall surface of the liquid guiding pipe 14.

Figure 5:
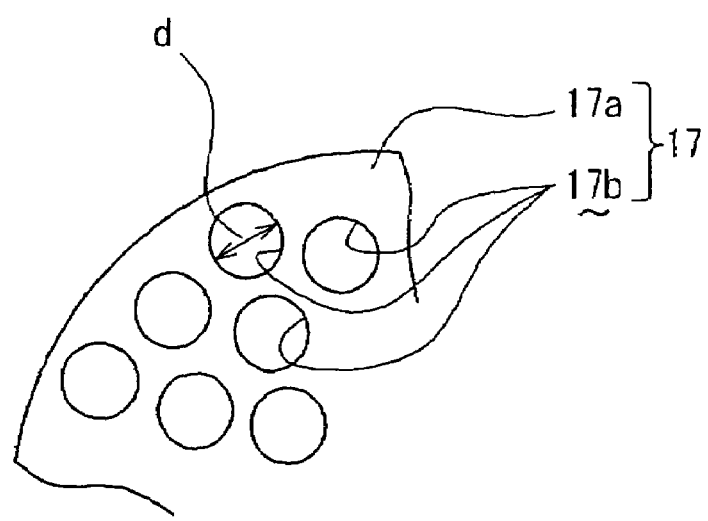
FIG. 5 is an enlarged view of a main part of a bubble passage prevention member in the present invention.

As shown in FIG. 5, the bubble passage prevention member 17 is formed by the bottom plate 17a and a number of holes 17b which are uniformly drilled in substantially all the surface of the bottom plate 17a. The bottom plate 17a has a thickness ranging from 1 mm to 2 mm. Each of the holes 17b has a diameter d ranging between 0.5 mm and 0.8 mm. The reason for setting the diameter d of each hole 17b between 0.5 mm and 0.8 mm is as follows. That is, when the diameter d is smaller than 0.5 mm, it is difficult for a liquid to pass through the hole 17b because of a surface tension. On the other hand, when the diameter d is larger than 0.8 mm, it is difficult for a liquid to flow through the hole 17b because of bubbles blocking up the hole 17b.

The coupling 20 has a lower communication channel 23c extending downward to be in communication with a lower end of the liquid guiding pipe 14. A liquid discharge pipe 25 made of a fluorocarbon resin such as PFA is secured (connected) to a lower end of the lower communication channel 23c by fixing means such as welding (see, FIG. 4). An on-off valve V4 is disposed on the liquid discharge pipe 25. Owing to the liquid discharge pipe 25 positioned below the part where the liquid guiding pipe 14 and the branching liquid guiding pipe 15 are connected to each other, it is possible to prevent, after the process liquid L in the tank 5 is discharged by the liquid discharge pipe 25, that the process liquid L remains in the branching liquid guiding pipe 15.

The position sensors 16 are attached on an outer peripheral wall of the branching liquid guiding pipe 15. Namely, there are arranged the four position sensors 16, i.e., the upper limit detecting sensor 16a, the adequate amount detecting sensor 16b, the replenishment detecting sensor 16c, and the lower limit detecting sensor 16d, in this order from above. These position sensors 16a, 16b, 16c, and 16d are capacitance sensors, for example, and are capable of highly accurately detecting a liquid level of the process liquid L in the branching liquid guiding pipe 15. These position sensors 16a, 16b, 16c, and 16d are electrically connected to control means as a controller 30 such as CPU. Detection signals outputted by the position sensors 16a, 16b, 16c, and 16d are transferred to the controller 30. Based on a signal from the controller 30, an opening/closing operation of the on-off valve V3 disposed on the process liquid supply pipe 13 is controlled. The controller 30 is electrically connected to a power source driving part of the heater, and is also electrically connected to not-shown display means such as a monitor, an alarm, and the like.

The provision of the position sensors 16a, 16b, 16c, and 16d on the branching liquid guiding pipe 15 makes it possible to reliably detect a position of the liquid level of the process liquid L in the tank 5 relative to predetermined positions.

The above detecting operation is started at a timing when the process liquid L is supplied into the tank 5 for the first time. When the process liquid L is fed into the chamber 2 and the amount of the process liquid L in the tank 5 is decreased, the lower limit detecting sensor 16d detects the liquid level of the process liquid L. At this timing, replenishment of the process liquid L is started. Then, the amount of the process liquid L in the tank 5 is increased, so that the adequate amount detecting sensor 16b detects the liquid level. At this timing, the on-off valve V3 is closed in accordance with a control signal from the controller 30 so as to stop the replenishment of the process liquid L. The replenishment of the process liquid can be performed in the following manners, for example. That is, (a) when the process liquid in the tank 5 is decreased and the replenishment detecting sensor 16c detects the liquid level, the process liquid L is supplied into the tank 5 until the adequate amount detecting sensor 16b detects the liquid level. Alternatively, (b) after a series of processing steps is completed, the process liquid L is supplied into the tank 5 until the adequate amount detecting sensor 16b detects the liquid level.

For example, when the three position sensors 16b to 16d detect the process liquid L, it can be judged that the liquid level of the process liquid L in the tank 5 is positioned higher than the predetermined position corresponding to the adequate amount detecting sensor 16b, but is positioned lower than the predetermined position corresponding to the upper limit detecting sensor 16a. In this case, it is judged that the liquid level of the process liquid L is adequate. When the process liquid L in the tank 5 is increased so that the upper limit detecting sensor 16a detects the liquid level, it can be judged that there is a possibility that the process liquid overflows. Thus, in accordance with a control signal from the controller 30, the on-off valve V3 is closed to stop the supply of the process liquid L from the process liquid supply source 12. At the same time, an alarm is given. When the process liquid in the tank 5 is decreased so that the lower limit detecting sensor 16d cannot detect the liquid level, it can be judged that the liquid level is underneath an allowable position.

When the process liquid in the tank 5 is decreased so that the replenishment detecting sensor 16c cannot detect the liquid surface, it can be judged that replenishment of the process liquid is required. Based on the signal, the process liquid L is supplied into the tank 5. At this time, in accordance with a control signal from the controller 30, the coiled heater disposed on the outer circumference of the tank 5 is controlled to stop a heating operation. The supply of the process liquid L continues until the adequate amount detecting sensor 16b detects the liquid level.

In a liquid processing system provided with the liquid level detector 10 as described above, the wafers W are processed in the following manner. At first, a plurality of, e.g., twenty-six wafers W, which have been carried by not-shown carrying means, are loaded into the chamber 2 and are received by the holding rods 1. Then, while rotating the wafers W by the rotor, the supply pump 6 is driven and the on-off valve V1 is opened, so that the process liquid (hydroxide peroxide solution) is sprayed from the injection nozzles 3 to supply the process liquid onto the wafers W. By supplying the process liquid to the wafers W, film qualities of a resist film and a polymer layer on each wafer W change to form cracks so as to facilitate penetration of the process liquid, and a sputtered Cu deposit is oxidized. In addition, the process liquid changes the property of a surface layer of the resist film and the property of a surface layer of the polymer layer from hydrophobic to hydrophilic. At this time, only the Cu deposit is selectively oxidized without oxidizing a Cu wiring layer as a base, because the sputtered Cu deposit has a high reactivity because of an influence of impurities or the like.

In the first several ten seconds of the processing step with the use of the process liquid, while spraying the process liquid, the rotor is rotated at a low speed of from 1 rpm to 500 rpm to diffuse the process liquid over the surfaces of the wafers W. The rotational speed of the rotor is controlled depending on a viscosity or the like of the process liquid such that the process liquid can uniformly diffuse. After the process liquid diffused, the rotational speed of the rotor is increased to, for example, 100 rpm to 3,000 rpm, to elevate a reactivity. From the viewpoint of enhancing a reactivity, it is preferable that the low speed rotation and the high speed rotation be alternately, repeatedly performed.

An atmospheric air is sufficient as an atmosphere during the processing step by means of the process liquid. However, from the view point of substantially, completely preventing oxidation of the Cu wiring layer, the inside of the chamber 2 is preferably in an inert gas atmosphere by supplying an $N_2$ gas as an inert gas from an $N_2$ gas supply source, not shown.

The process liquid used for processing the wafers W is discharged from the drain port 2a through the drain pipe 8. At this time, by switching the switching valve Vc, the discharged process liquid passes through the returning pipe 9 and is collected in the tank 5. If required, at a timing between just after completion of the process-liquid processing step and before starting of the succeeding process, the new process liquid is supplied into the tank 5 from the process liquid supply source 12 through the process liquid supply pipe 13.

During the above process, a level of the process liquid L in the tank 5 is monitored by the liquid level detector 10. That is, as described above, the liquid level of the process liquid L in the branching liquid guiding pipe 15, which liquid level conforms to the liquid level of the process liquid L stored in the tank 5, is detected by the position sensors 16 (16a, 16b, 16c, 16d) so as to maintain an adequate amount of the process liquid L in the tank 5.

After the process is finished, the on-off valve V4 is opened to discharge the process liquid L in the tank 5 through the liquid discharge pipe 25. Since the surface, i.e., the bottom plate 17a of the bubble passage prevention member 17 is coplanar with the inner wall surface of the liquid guiding pipe 14, it can be prevented that the process liquid L including bubbles remains at a position where the branching liquid guiding pipe 15 branches off from the liquid guiding pipe 14. Thus, during the supply of the new process liquid into the tank 5, bubbles generated in the process liquid flowing into the liquid guiding pipe 14 and the branching liquid guiding pipe 15 from the tank 5 can be prevented from entering the branching liquid guiding pipe 15 by the bubble passage prevention member 17. In other words, the bubbles are made to flow into the liquid guiding pipe 14 (see, FIG. 3). Accordingly, the process liquid L flowing into the branching liquid guiding pipe 15 has no bubble which may affect detection by the position sensors 16 (16a, 16b, 16c, 16d). As a result, an amount of the process liquid L in the tank 5 can be exactly detected by the position sensors 16 (16a, 16b, 16c, 16d).

In the above embodiment, the liquid processing system for removing a metal deposit deposited on the wafer W. However, the liquid processing system provided with a liquid level detector according to the present invention can be applied to an object to be processed other than the wafer W, such as an LCD substrate and a CD substrate. Needless to say, the liquid level detector can be applied to a tank for storing therein a liquid other than the above process liquid.

The invention claimed is:

1. A liquid level detector for detecting a liquid level of a liquid stored in a tank, comprising:
   a liquid guiding pipe connected to the tank and guiding the liquid in the tank in such a manner that a liquid level of the guided liquid conforms to a liquid level of the liquid in the tank;
   a branching liquid guiding pipe for detecting a liquid level, the branching liquid guiding pipe branching off from the liquid guiding pipe and guiding the liquid in such a manner that a liquid level of the guided liquid conforms to a liquid level of the liquid in the tank;
   a discharge pipe, connected to the liquid guiding pipe below where the branching liquid guiding pipe branches from the liquid guiding pipe, for discharging liquid from the liquid guiding pipe and the branching liquid guiding pipe;
   a position sensor for detecting a liquid level of the liquid in the branching liquid guiding pipe; and
   a bubble passage prevention member of a porous plate shape disposed on a part where the liquid guiding pipe and the branching liquid guiding pipe are connected to each other, for preventing bubbles generated in the liquid from entering the branching liquid guiding pipe from the liquid guiding pipe, wherein
   a surface of the bubble passage prevention member is coplanar with an inner wall surface of the liquid guiding pipe.

2. The liquid level detector according to claim 1, wherein a diameter of each hole in the bubble passage prevention member is between 0.5 mm to 0.8 mm.

3. The liquid level detector according to claim 1, wherein the liquid guiding pipe is in communication with a communication channel extending downward from the part where the liquid guiding pipe and the branching liquid guiding pipe are connected to each other, and the liquid discharge pipe is connected to a lower end of the communication channel.

4. A liquid processing system comprising a tank for storing a process liquid, a processing part where an object to be processed is processed by the liquid in the tank, and a liquid level detector for detecting a liquid level of the liquid stored in the tank, wherein
   the liquid level detector includes:
   a liquid guiding pipe connected to the tank and guiding the liquid in the tank to an inside thereof in such a manner that a liquid level of the guided liquid conforms to a liquid level of the liquid in the tank;
   a branching liquid guiding pipe for detecting a liquid level, the branching liquid guiding pipe branching off from the liquid guiding pipe and guiding the liquid into an inside thereof in such a manner that a liquid level of the guided liquid conforms to a liquid level of the liquid in the tank;

a discharge pipe, connected to the liquid guiding pipe below where the branching liquid guiding pipe branches from the liquid guiding pipe, for discharging liquid from the liquid guiding pipe and the branching liquid guiding pipe;

a position sensor for detecting a liquid level of the liquid in the branching liquid guiding pipe; and a bubble passage prevention member of a porous plate shape disposed on a part where the liquid guiding pipe and the branching liquid guiding pipe are connected to each other, for prevention bubbles generated in the liquid from entering the branching liquid guiding pipe from the liquid guiding pipe, wherein a surface of the bubble passage prevention member is coplanar with an inner wall surface of the liquid guiding pipe.

5. The liquid processing system according to claim 4, wherein a diameter of each hole in the bubble passage prevention member is between 0.5 mm to 0.8 mm.

6. The liquid processing system according to claim 4, wherein the liquid guiding pipe is in communication with a communication channel extending downward from the part where the liquid guiding pipe and the branching liquid guiding pipe are connected to each other, and the liquid discharge pipe is connected to a lower end of the communication channel.

7. The liquid processing system according to claim 4, wherein an upper opening of the tank is closed by a lid, and an upper end of the liquid guiding pipe and an upper end of the branching liquid guiding pipe are connected inside of the tank.

8. The liquid level detector according to claim 2, wherein the liquid guiding pipe is in communication with a communication channel extending downward from the part where the liquid guiding pipe and the branching liquid guiding pipe are connected to each other, and the liquid discharge pipe is connected to a lower end of the communication channel.

9. The liquid processing system according to claim 5, wherein the liquid guiding pipe is in communication with a communication channel extending downward from the part where the liquid guiding pipe and the branching liquid guiding pipe are connected to each other, and the liquid discharge pipe is connected to a lower end of the communication channel.

10. The liquid processing system according to claim 5, wherein an upper opening of the tank is closed by a lid, and an upper end of the liquid guiding pipe and an upper end of the branching liquid guiding pipe are connected inside the tank.

11. The liquid processing system according to claim 6, wherein an upper opening of the tank is closed by a lid, and an upper end of the liquid guiding pipe and an upper end of the branching liquid guiding pipe are connected inside the tank.

* * * * *